United States Patent [19]
Jaspers

[11] 3,967,354
[45] July 6, 1976

[54] HEAT EXCHANGER

[75] Inventor: Hendrik Alphons Jaspers, Briarcliff Manor, N.Y.

[73] Assignee: U.S. Philips Corporation, New York, N.Y.

[22] Filed: Feb. 21, 1974

[21] Appl. No.: 444,363

[30] Foreign Application Priority Data
  Mar. 26, 1963 Netherlands.................... 7304161

[52] U.S. Cl............................ 29/157.3 D; 165/166
[51] Int. Cl.² ........................................ B23P 15/26
[58] Field of Search................ 29/157.3 D, 157.3 R; 113/118 D, 118 R; 165/166

[56] References Cited
UNITED STATES PATENTS

| | | | |
|---|---|---|---|
| 213,635 | 3/1879 | Drache | 165/166 |
| 2,912,749 | 11/1959 | Bauernfeind et al. | 29/157.3 R |
| 2,952,444 | 9/1960 | Jenssen | 113/118 R |
| 2,959,400 | 11/1960 | Simpelaar | 113/118 R |
| 3,307,530 | 3/1967 | Stack | 165/166 X |
| 3,537,165 | 11/1970 | Paddock et al. | 29/157.3 D |

FOREIGN PATENTS OR APPLICATIONS

| | | | |
|---|---|---|---|
| 1,125,663 | 7/1956 | France | 165/166 |
| 574,949 | 1/1946 | United Kingdom | 113/118 D |

Primary Examiner—C.W. Lanham
Assistant Examiner—V. K. Rising
Attorney, Agent, or Firm—Frank R. Trifari; J. David Dainow

[57] ABSTRACT

A method of manufacturing a cross-flow plate-type heat exchanger in which I-shaped plates are assembled with end plates, and subjected to compression and a thermal treatment, whereby the plates are connected.

7 Claims, 12 Drawing Figures

HEAT EXCHANGER

BACKGROUND OF THE INVENTION

The invention relates to a method of manufacturing a heat exchanger, comprising a stack of plates which is situated between two end plates and between which first and second flow ducts for heat-exchanging media are alternately present. Heat exchangers of the kind set forth are inter alia known from German Patent No. 817,760 and British Patent No. 574,949.

In the heat exchangers described in the said Patents, the first and second flow ducts are formed by heat-exchange plates which are arranged at a distance from each other, corrugated plates being arranged in these ducts. However, the flow ducts can alternatively be formed in a variety of other ways, for example, by grooves in flat plates, by plates which are profiled on one or on both sides, etc.

The heat exchanger which is the subject of the method according to the invention is intended as a cooler for hot-gas engines. A hot-gas engine is an engine having a closed net working space in which a working medium, for example, hydrogen or helium, completes a thermodynamic cycle, wherein the high-pressure medium (above 250 atmospheres) receives heat from outside the working space and, the working medium is alternately compressed and expanded. In the cooler the high-pressure working medium gives off the compression heat to a cooling medium, usually water.

In known hot-gas engines the cooler is composed of a number of independent cooler elements (British Patent No. 1,053,052). Each cooler element consists of a large number of thin pipes (approximately 15+) through which working medium can flow to and fro between the expansion space and the compression space. The upper and lower ends of the pipes are mounted in perforated end-plates and are soldered thereto forming a gastight junction. The cooler element is accommodated, together with regenerator element communicating with the pipes, in a cylindrical housing which is provided with an inlet and an outlet for cooling medium at the area of the pipes. This pipe-type cooler has the drawback that its construction is expensive and unsuitable for bulk manufacture.

SUMMARY OF THE INVENTION

The invention has for its object to provide a method which is suitable for the bulk manufacture of inexpensive plate-type heat exchangers of the kind set forth, which are suitable for direct use as a cooler in hot-gas engines in order to replace the pipe-type cooler.

The method according to the invention is characterized in that at least mainly I-shaped plates are stacked so as to form an I-shaped packet, after which the assembly of I-shaped packet and end plates is subjected to a thermal treatment during which the plates and end plates are connected to each other by soldering or diffusion so that a material block is obtained; the wider end portions of which are subsequently formed into rotation-symmetrical, notably circle-cylindrical portions by a chipping or other material-removing treatment of the side walls.

A plate-type heat exchanger is thus obtained which is substantially cheaper than the pipe-type cooler and which can replace the latter in the cylindrical housing. Seals can be readily provided between the wall of the housing and the walls of the rotation-symmetrical end portions of the heat exchanger, so as to ensure leak-free separation of the high-pressure working medium and the cooling medium.

In the plate-type heat exchanger which is known from German Patent No. 817,760 edge seals are provided between the edge strips of adjoining plates in the form of sealing strips which seal the heat exchanger from the surroundings. Such edge seals are not capable of withstanding high temperatures such as occur during the heat treatment according to the present method. The high working medium pressures in excess of 250 atmospheres and the large pressure variations in the hot-gas engine would deform or press out the said seals, thus causing leakage in the heat exchanger. To eliminate this drawback, sealing strips of the same material as the edge strips are provided according to the invention.

A preferred embodiment of the method according to the invention is characterized in that in the initial state, the sealing strips are integral with the plates, each sealing strip adjoining an associated edge strip, mutually mirror-symmetrical with respect to the boundary line, the sealing strips being folded over along the boundary line prior to stacking. Consequently the sealing strips need not be separately manufactured and stacked.

If profiled plates are present in the stack of plates, according to the invention the plate thickness in the initial state is equal to half the profile height.

So to achieve proper adherence of the plates, according to the invention the plates are compressed during the thermal treatment.

In a further preferred embodiment of the method according to the invention, the plates are steel plates which are covered with a layer of copper. This results in a heat exchanger which is very well capable of withstanding high pressures and high temperatures and whose plates adhere very well to each other as a result of copper diffusion.

According to the invention, grooves for sealing rings are provided in the walls of the rotation-symmetrical portions. This is easier than the provision of grooves in the wall of the housing. For the sealing between high-pressure working medium and cooling medium use can be made, for example, of so-termed O-rings.

Furthermore, according to the invention it is advantageous to provide clamping rings about the rotation-symmetrical portions. In spite of large working medium pressure variations, the lateral shape stability of the heat exchanger is then always ensured.

The invention furthermore relates to a heat exchanger which is particularly suitable as a cooler for hot-gas engines and which is manufactured according to the described method.

The invention will be described with reference to the diagrammatic drawing which is not to scale.

BRIEF DESCRIPTION OF THE DRAWINGS

FIG. 2 shows a corrugated I-shaped plate, the wider end portions of which form edge strips which are adjoined by sealing strips. FIG. 2a is a front view of the plate in the initial state; FIG. 2b is a sectional view taken along the line IIb-IIb of FIG. 2a; FIG. 2c is a front view of the plate after the folding of the sealing strips, and FIG. 2d is a sectional view taken along the line IId-IId of FIG. 2c.

FIGS. 3b and 3d are sectional views of FIGS. 3a and 3c, respectively, at the area of the lines IIIb-IIIb and IIId-IIId, respectively.

DETAILED DESCRIPTION OF THE PREFERRED EMBODIMENT

Figure 1:
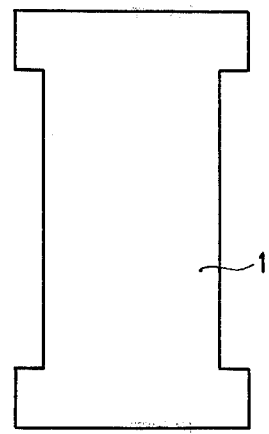
FIG. 1 is a front view of a flat I-shaped heat-exchange plate.

The heat exchanger shown in the drawing comprises heat-exchange plates 1, first corrugated plates 2, second corrugated plates 3, and end plates 4.

The corrugated plates 2 (FIG. 2) comprise edge strips 2' between which the corrugations extend mutually parallel in the transverse direction. The edge strips are adjoined by sealing strips 2'' of the same shape and dimensions.

Figures 2A, 2B, 2C, 2D:
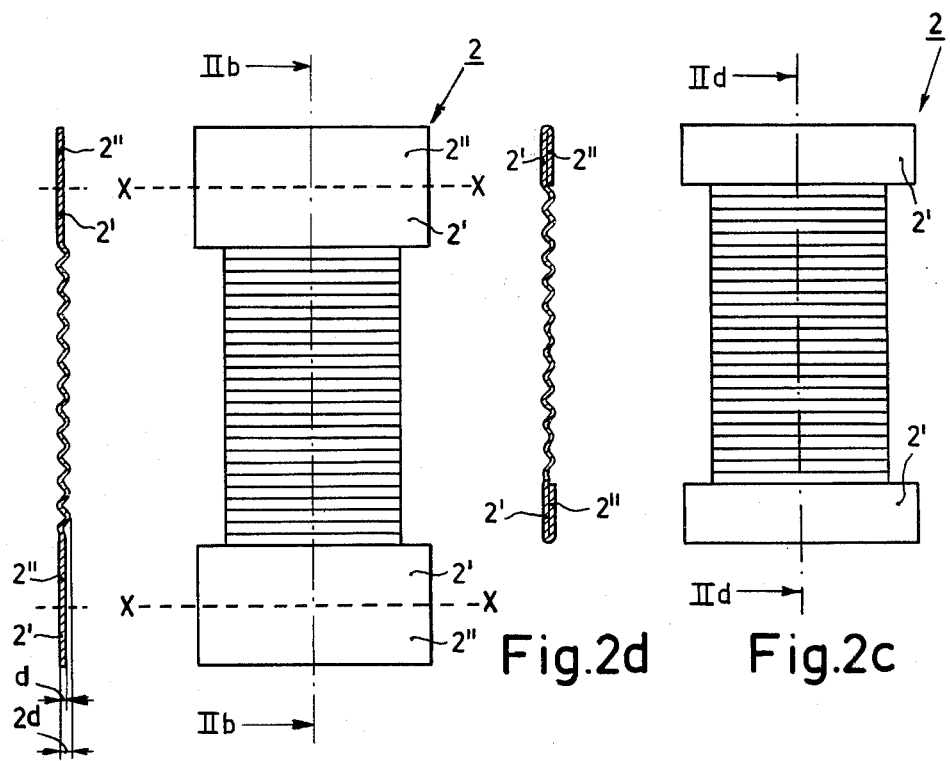

As appears from FIG. 2b, the plate thickness $d$ is equal to half the corrugation height, while the left-hand sides of both edge strips and sealing strips and the left-hand corrugation crests are tangent to a common plane. After the folding of the sealing strips 2'' along the boundary lines X-X (to the right in FIG. 2b), a plate as shown in the FIGS. 2c and 2d is obtained, the latter Figure showing that the right-hand sides of the sealing strips and the right-hand corrugation crests also have a common tangent plane. During the stacking, on the one side corrugation crests with edge strips and on the other side corrugation crests with sealing strips engage neighbouring heat-exchange plates.

Figure 3:
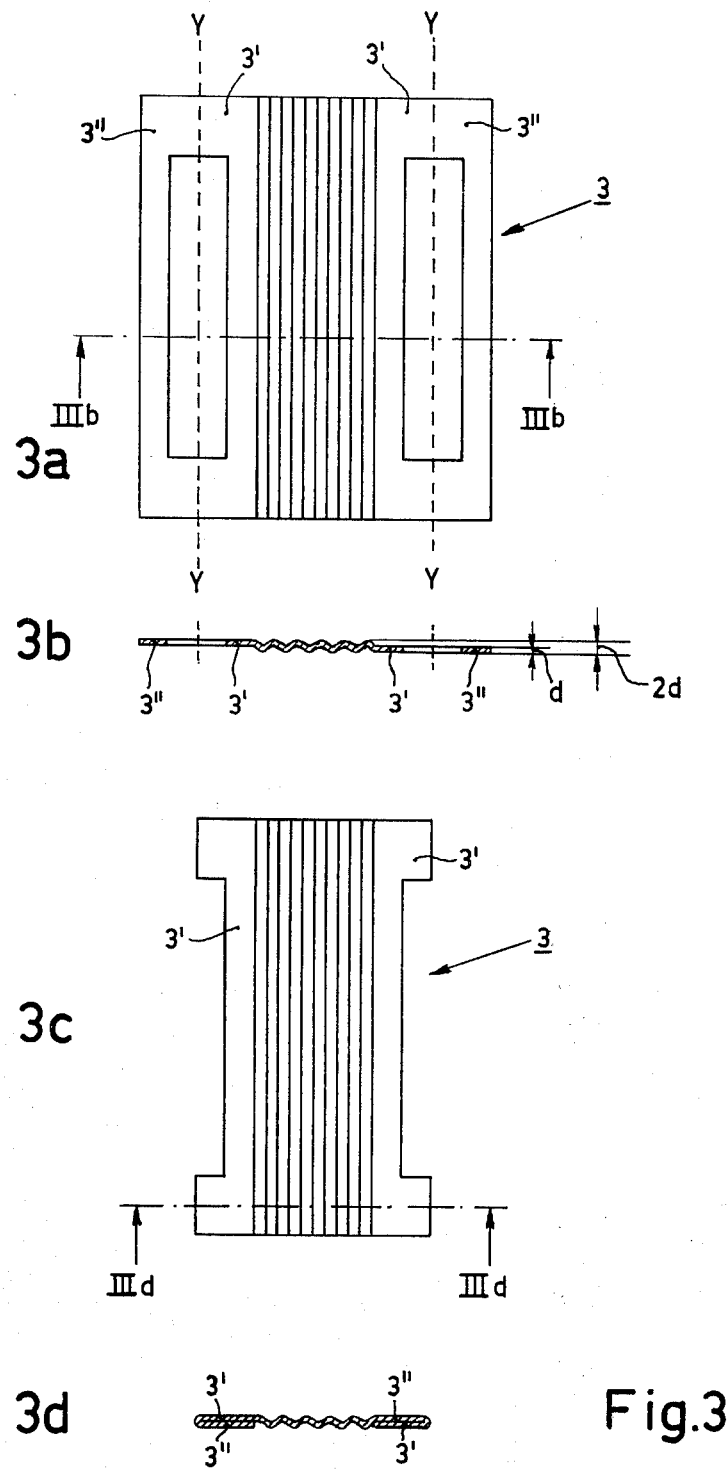
FIG. 3 shows an I-shaped corrugated plate, the side edges of which form edge strips which are adjoined by sealing strips. Similar to FIG. 2, FIGS. 3a and 3c show the plate in a front view in the initial state and in the state with folded sealing strips, respectively.

The corrugated plates 3 according to FIG. 3 are provided with edge strips 3' between which the corrugations extend mutually parallel in the longitudinal direction. The edge strips 3' are adjoined by sealing strips 3'' of the same shape and dimensions, mutually mirror-symmetrical with respect to the boundary line Y—Y (FIG. 3a).

FIG. 3b shows that the plate thickness $d$ is again equal to half the corrugation height. The upper side of the left-hand edge strip and the sealing strip have a tangent plane in common with the upper corrugation crests, whilst the lower side of the right-hand edge strips and the sealing strip has a tangent plane in common with the lower corrugation crests. The left-hand sealing strip 3'' is folded downwards along the boundary line Y—Y, the right-hand sealing strip being folded upwards, with the result that the plate as shown in the FIGS. 3c and 3d is obtained.

Figure 4:
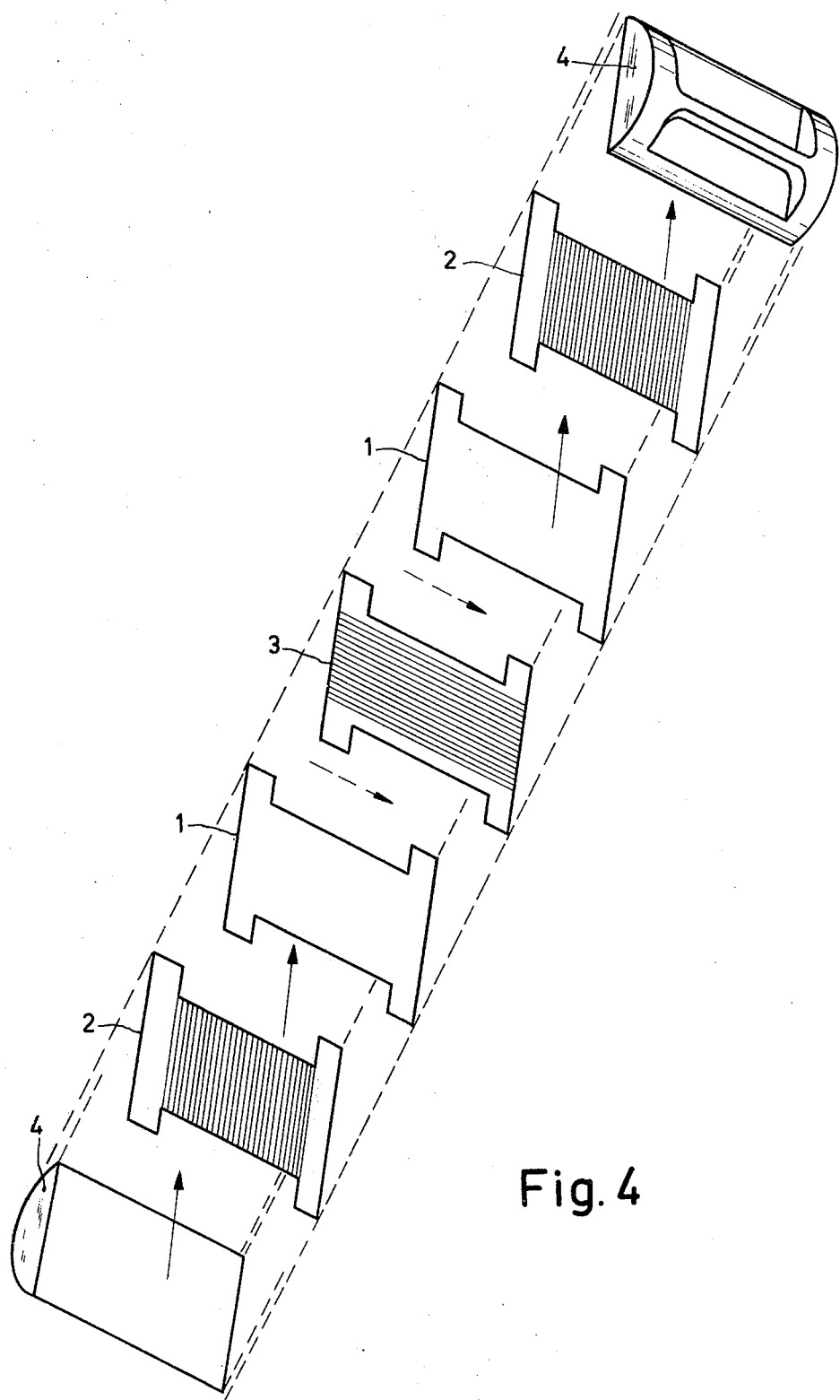
FIG. 4 diagrammatically shows the construction of a heat exchanger consisting of heat-exchange plates, first and second corrugated plates and end plates.

The corrugated plates with folded sealing strips are assembled with the heat-exchange plates so as to form an I-shaped packet according to the diagram of FIG. 4, and are subjected in a compressed condition, together with the end plates 4, to a thermal treatment, with the result that the plates adhere to each other. A high-quality heat exchanger is obtained by using copper-plated steel plates which adhere very well to each other due to the diffusion of the copper. The block thus obtained is subsequently rounded on the wider end portions and is provided with grooves in which the sealing rings can be accommodated.

Figure 5:
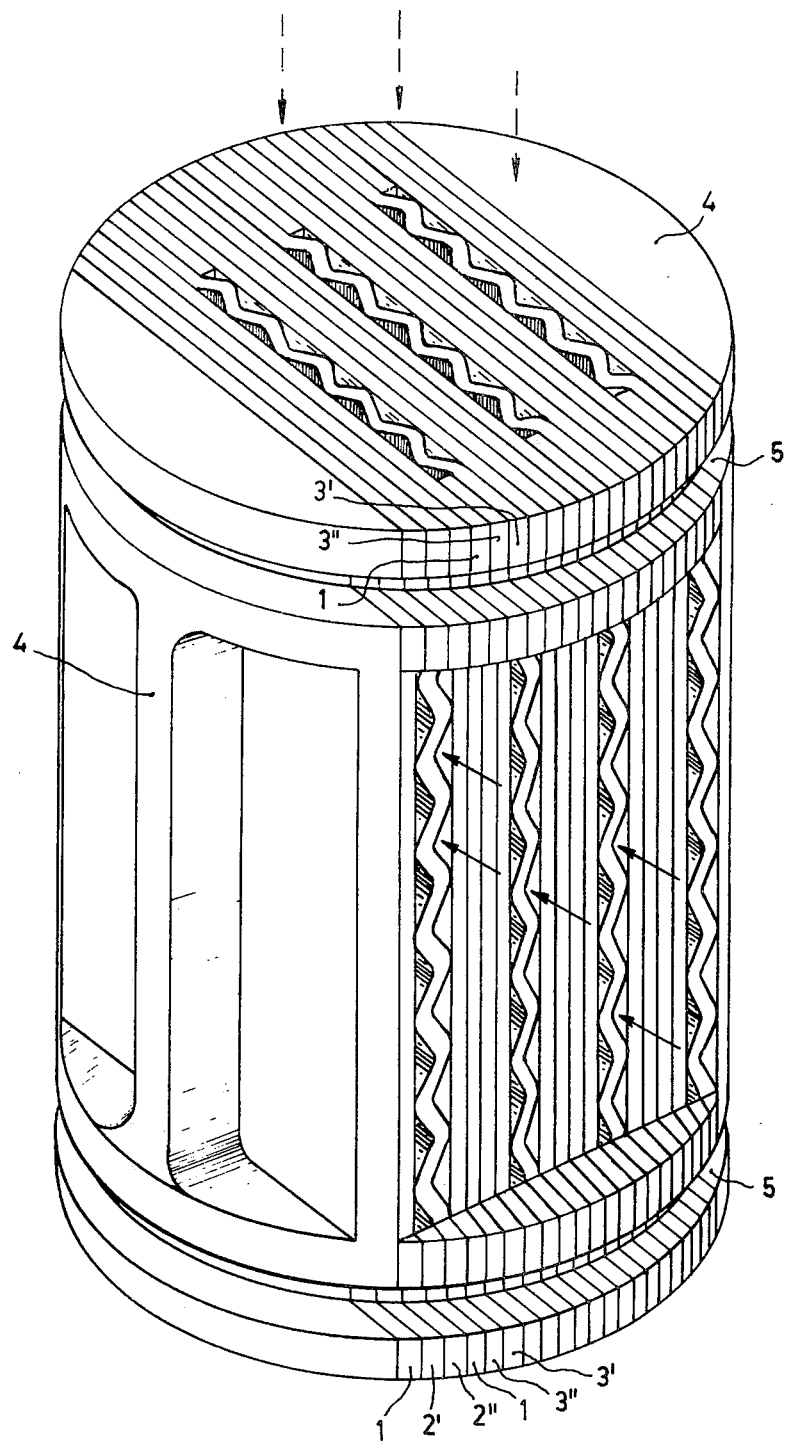
FIG. 5 is a perspective view of a finished heat exchanger.

Rounding can be effected by a chipping operation or, for example, in an (electro)chemical manner. The result is the cross-flow heat exchanger as shown in FIG. 5. Like in FIG. 4, the uninterrupted and broken arrows denote the two flow directions for the heat-exchanging media. Clamping rings can be provided about the round end portions, but this is not shown in the drawing. The two grooves are denoted by the reference 5. The other references correspond to those of the preceding Figures.

In the described embodiment the crests of the parallel extending corrugations of the corrugated plates contact the heat-exchange plates and the corrugations are parallel to the associated flow directions. Needless to say that a great many variations are feasible, such as the corrugation crests not in contact with the heat-exchange plates and corrugations at an angle or transverse to the associated flow direction, with or without perforations in the corrugated plates for passage of the medium. It is alternatively possible to use I-shaped plates comprising edge strips whose thickness is equal to or larger than the corrugation height so that no additional sealing strips are required.

In the present embodiment end plates are used which already have a partly circle-cylindrical shape and which have a width which is smaller than the width of the end portions of the I-shaped plates. It is obvious that I-shaped end plates, whether or not flat, can alternatively be used. In the drawing the end portions of the heat exchanger are shown to be rounded so as to form circle-cylindrical portions, but in view of the mounting in the housing it may also be desirable that these end portions have a different rotation-symmetrical shape, for example, a conical shape.

I claim:

1. A method of manufacturing a cross-flow heat exchanger formed of at least one set of first, second, and third adjacent heat exchange plates having end portions, a first corrugated plate having side edges and end portions and having between said side edges thereof, lengthwise corrugations from end to end of said plate, this corrugated plate being between and defining with said first and second heat exchange plates first fluid flow paths along corrugations thereof, a second corrugated plate similar to the first corrugated plate and situated between and defining with said second and third heat exchange plates, second fluid flow paths similar to and transverse of the direction of said first fluid flow paths, said heat exchange and corrugated plates all comprising adjacent I-shape surfaces of substantially the same size and orientation, and an end plate outward of each of the two opposite outermost surfaces of said heat exchange plates, the method comprising the steps: coating said plates with a fusible coating, bending each of the end portions of each corrugated plate over on itself to form a double thickness sealing edge, positioning said plates in a stack with the I-shaped surfaces adjacent, adhering said plates together by compressing said plates together and thermally treating same, and thereby fusing coatings of said adjacent plates and machining said assembled plates to a cylindrical shape whose axis is parallel to the axes of the I's of said plates.

2. A method according to claim 1 wherein said plates are steel and said coating is copper.

3. A method according to claim 1 where typical corrugations have height between opposite crests equal to double the plate thickness.

4. A cross-flow heat exchanger formed as a cylinder and made according to the method of claim 1, said heat exchanger comprising at least one set of first, second, and third adjacent heat exchange plates having end portions, a first corrugated plate having side edges and end portions and having between said side edges thereof, lengthwise corrugations from end to end of said plate, this corrugated plate being between and defining with said first and second heat exchange plates first fluid flow paths along corrugations thereof, a second corrugated plate similar to the first corrugated plate and situated between and defining with said second and third heat exchange plates, second fluid flow paths similar to and transverse of the direction of said first fluid flow paths, said heat exchange and corrugated plates comprising adjacent I-shaped surfaces of substantially the same size and orientation, and an end plate outward of each of the two opposite outermost surfaces of said heat exchange plates, said plates having thereon a fusible coating, each of the end portions of each corrugated plate being bent over on itself to form a double thickness sealing edge, said plates being stacked together with the I-surfaces adjacent and the axis of the I's parallel to the axis of said cylinder, said coatings of adjacent plates being fused together whereby said plates are adhered together.

5. A cross-flow heat exchanger formed as a cylinder and comprising at least one set of first, second, and third adjacent heat exchange plates having end portions, a first corrugated plate having side edges and end portions and having between said side edges thereof, lengthwise corrugations from end to end of said plate, this corrugated plate being between and defining with said first and second heat exchange plates first fluid flow paths along corrugations thereof, a second corrugated plate similar to the first corrugated plate and situated between and defining with said second and third heat exchange plates, second fluid flow paths similar to and transverse of the direction of said first fluid flow paths, said heat exchange and corrugates plates all comprising adjacent I-shape surfaces of substantially the same size and similar orientation and an end plate outward of each of the two opposite outermost surfaces of said heat exchange plates, said plates having thereon a fusible coating, each of the end portions of each corrugated plate being bent over on itself to form a double thickness sealing edge, said plates being stacked together with the I-shaped surfaces adjacent and the axes of the I parallel to the axis of the cylinder, said coating of adjacent plates being fused together, whereby said plates are adhered together.

6. A heat exchanger according to claim 5 wherein said plates are steel and said coating is copper.

7. A heat exchanger according to claim 4 wherein said plates are steel and said coating is copper.

* * * * *

UNITED STATES PATENT AND TRADEMARK OFFICE
CERTIFICATE OF CORRECTION

PATENT NO. : 3967354
DATED : July 6, 1976
INVENTOR(S) : HENDRIK ALPHONS JASPERS

It is certified that error appears in the above—identified patent and that said Letters Patent are hereby corrected as shown below:

In the heading, under "Foreign Application Priority Data"

"Mar. 26, 1963" should be --Mar. 26, 1973--

Signed and Sealed this

Thirtieth Day of November 1976

[SEAL]

Attest:

RUTH C. MASON
*Attesting Officer*

C. MARSHALL DANN
*Commissioner of Patents and Trademarks*